United States Patent [19]

Winkel et al.

[11] Patent Number: 5,212,495
[45] Date of Patent: May 18, 1993

[54] COMPOSITE SHELL FOR PROTECTING AN ANTENNA OF A FORMATION EVALUATION TOOL

[75] Inventors: David A. Winkel, Middletown; Mark M. Bochain, Moodus, both of Conn.

[73] Assignee: Teleco Oilfield Services Inc., Meriden, Conn.

[21] Appl. No.: 558,075

[22] Filed: Jul. 25, 1990

[51] Int. Cl.⁵ .................. H01Q 1/420; H01Q 1/400; G01V 3/100; G01V 3/180
[52] U.S. Cl. .................. 343/872; 343/719; 343/873; 324/338; 324/342
[58] Field of Search ............. 324/338, 323, 339–343, 324/356, 359; 343/872, 719, 873

[56] References Cited

U.S. PATENT DOCUMENTS

| | | | |
|---|---|---|---|
| 4,494,072 | 1/1985 | Jeter et al. | 324/356 |
| 4,536,714 | 8/1985 | Clark | 324/338 |
| 4,659,598 | 4/1987 | Traut | 343/872 |
| 4,766,096 | 8/1988 | Layden et al. | 501/17 |
| 4,785,247 | 11/1988 | Meador et al. | 324/338 |
| 4,940,943 | 7/1990 | Bartel et al. | 324/338 |
| 4,956,393 | 9/1990 | Boyd et al. | 343/872 |

OTHER PUBLICATIONS

Jask et al., Antenna Engineering Handbook, 2nd Ed., McGraw-Hill, N.Y., 1984, Chapter 44, Radomes, pp. 44-1 to 44-7.

*Primary Examiner*—Rolf Hille
*Assistant Examiner*—Peter Toby Brown
*Attorney, Agent, or Firm*—Fishman, Dionne & Cantor

[57] ABSTRACT

A fiber reinforced polymer matrix composite shell for covering the elastomeric layer surrounding the antenna of a measurement-while-drilling borehole formation evaluation tool is disclosed. The shell protects the elastomeric layer and associated antenna from wear and abrasion. If damaged during drilling, the shell may be replaced at the drillsite with minimal downtime.

10 Claims, 2 Drawing Sheets

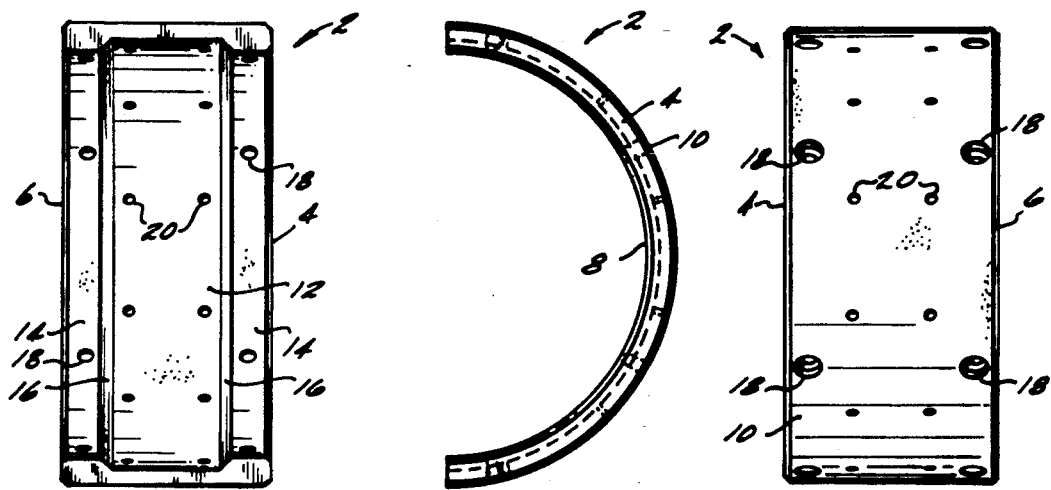

COMPOSITE SHELL FOR PROTECTING AN ANTENNA OF A FORMATION EVALUATION TOOL

TECHNICAL FIELD

This invention pertains to the art of oil and gas borehole formation evaluation and more particularly to a formation evaluation tool.

BACKGROUND OF THE INVENTION

Measurement-While-Drilling (MWD) electromagnetic propagation based borehole formation evaluation tools for use in oil and gas well drilling applications are known. Typically, electromagnetic based evaluation tools include a housing, which forms part of the drillstring, a transmitting antenna mounted in the housing and a pair of receiving antennas mounted in the housing. Typically, each of the antennas takes the form of a wire loop secured within a circumferential groove surrounding the housing. Each antenna is embedded in a layer of an elastomeric material to protect the antenna from shock, vibration and moisture during the drilling process. An electromagnetic wave is propagated from the transmitting antenna into the formation surrounding the borehole and is detected as it passes the receiving antennas. The signals received are used to calculate electrical properties, e.g., permitivity, resistivity, of the formation.

The elastomeric layer surrounding the antenna is vulnerable to wear, abrasion and adhesive failure between the layer and the tool housing, any one of which may lead to failure of the layer and its associated antenna.

Repair of a failed antenna is particularly burdensome, in that the formation evaluation tool must be removed from the borehole and shipped from the drilling site to a repair facility. This results in considerable downtime and expenses and necessitates maintaining an inventory of replacement tools at the drill site.

SUMMARY OF THE INVENTION

A shell for an antenna of a formation evaluation tool is disclosed. The shell comprises a rigid, abrasion resistant, electromagnetically transparent shell for covering the elastomeric layer surrounding the antenna and means for removably securing the shell.

In a preferred embodiment, the shell comprises a tubular wall having a pair of diametrically opposite wall portions wherein each of the wall portions has an inner surface and an outer surface and each of the wall portions include means for equalizing pressure between the outer surface and the inner surface.

In a preferred embodiment, the shell comprises a glass fiber reinforced thermoset epoxy matrix composite material.

A formation evaluation tool including a housing having a circumferential groove defined in its surface, an antenna loop surrounding the housing and secured within the groove and elastomeric means for protecting said antenna loop from shock and moisture is disclosed. The tool further includes a shell, removably secured to said housing and covering said elastomeric means, for protecting said elastomeric means from abrasion.

A process for protecting an antenna of a formation evaluation tool is disclosed. The process includes removably securing a fiber reinforced polymer matrix composite shell to the housing of the tool to protect the elastomeric layer surrounding the antenna from abrasion. The shell may be replaced at the drill site should the shell become damaged during the drilling operation.

BRIEF DESCRIPTION OF THE DRAWINGS

FIG. 1 shows a front view of the shell of the present invention.

FIG. 2 shows a back view of the shell of the present invention.

FIG. 3 shows a top view of the shell of the present invention.

FIG. 4 shows a longitudinal cross sectional view of the formation evaluation tool of the present invention.

FIG. 4a shows a cross sectional view of an alternative embodiment of wall portion of FIG. 4.

DETAILED DESCRIPTION OF THE INVENTION

Figure 5:
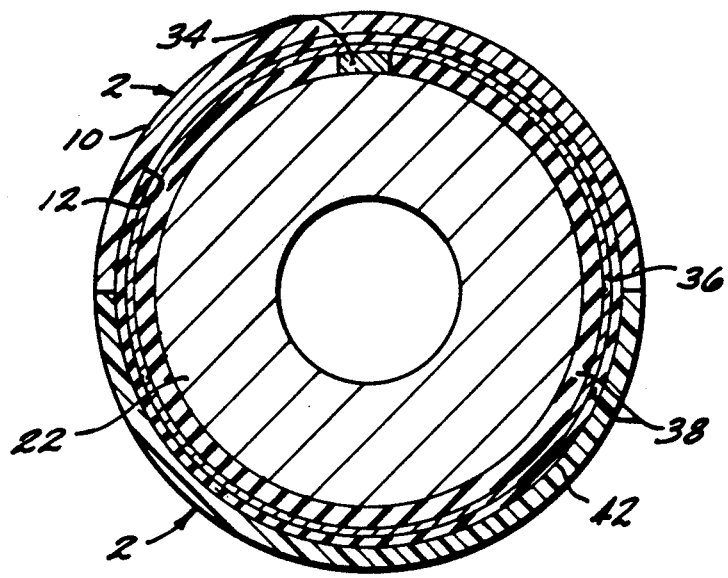
FIG. 5 shows a transverse cross sectional view taken along line 5—5 of FIG. 4.

Referring to FIGS. 1–4, the shell of the present invention includes a pair of rigid wall portions 2. Each of the wall portions 2 includes a top end 4, a bottom end 6, a profiled inner surface 8 and an outer surface 10. The profiled inner surface 8 defines a central trapezoidal indentation and includes a central portion 12 a pair of shoulder portions 14 on opposite sides of the central portion 12 and a pair of transitional surfaces 16, each extending between the central portion 12 and one of the shoulder portions 14. Each wall portion 2 includes a plurality of bolt holes 18 through each of the shoulder portions 14 and a plurality of vent holes 20 which communicate between the inner surface 8 and the outer surface 10 of the wall portion 2.

Referring to FIGS. 4 and 5, the formation evaluation tool of the present invention includes a cylindrical housing 22 having an outer surface 24. A circumferential groove 26 is defined by the outer surface 24. The groove 26 includes a toric central portion 28 and a pair of cylindrical shoulder portions 30 defined on opposite sides of the central portion 28. A plurality of circumferentially spaced apart threaded holes 32 are provided in each of the shoulder portions 30.

A mounting bracket 34 is secured within the central portion 28 of groove 26. An antenna loop 36 surrounds the housing 22 and is secured to the mounting bracket 34. The antenna may be a transmitting antenna or a receiving antenna.

An elastomeric layer 38 is bonded to the housing 22 within groove 26 and surrounds antenna loop 36. The elastomeric layer 38 may comprise any elastomer that retains flexibility at low temperatures, i.e., temperatures down to about −50° F. Preferably, the elastomeric layer 38 comprises a nitrile-based rubber. The elastomeric layer 38 protects the antenna from shock, vibration and moisture. The elastomeric layer 38 has a profiled outer surface 40 that is substantially complimentary to the profiled inner surface 8 of wall portion 2. The profiled outer surface 40 includes a central portion 42, and a pair of side portions 44 each extending from central portion 42 toward housing 22. In a longitudinal cross sectional view the profiled outer surface 40 exhibits a trapezoidal cross section wherein side portion 44 extend from opposite sides of the central portion 42 at an angle between 40° and 50° relative to the central portion 42.

A pair of wall portions 2 are secured to housing 16 and cover the elastomeric layer 38. The wall portions are secured to the housing 22 by a plurality of bolts 46, each of which passes through a bolt hole 18 and is threadably secured in one of the threaded holes 32 in the housing 22.

The wall portions may comprise any rigid, impact resistant, abrasion resistant and electrically nonconductive material that is resistant to elevated temperatures, i.e., up to about 200° C., and is resistant to oilfield chemicals. Electrically conductive materials, e.g. metals, carbon, are not suitable for use as wall portion materials, since electrically conductive materials interfere with electromagnetic waves, i.e., are not electromagnetically transparent, and would compromise the performance of the antenna covered by such.

Preferably, the wall portions comprise a material that exhibits a high heat deflection temperature, i.e., greater than about 200° C., a high flexural strength, i.e., greater than about 80,000 psi, a high tensile strength, i.e., greater than about 50,000 psi, a high flexural modulus, i.e., greater than about $3.0 \times 10^6$ psi, an Izod impact strength greater than about 10 ft lb/in and a dielectric constant greater than about 4. For example, the wall portions may comprise a fiber reinforced polymer matrix composite material or a fiber reinforced ceramic material. In a preferred embodiment, the wall portions comprise fiber reinforced polymer matrix composite material. As a more costly alternative of particular interest in applications requiring resistance to extremely high temperatures and very high abrasion resistance, the wall portions may comprise a fiber reinforced ceramic matrix composite material or a combination, e.g. a laminated structure, of fiber reinforced polymer matrix composite material and a fiber reinforced ceramic matrix composite material. Suitable polymer matrix and ceramic matrix composite materials may be made by conventional processes and are commercially available.

The matrix of a fiber reinforced composite wall portion may comprise any electrically nonconductive material that is resistant to oilfield chemicals and resistant to elevated temperatures. For example, the matrix material may comprise a polymer or a ceramic material. Heat cured cross linked epoxy compositions are preferred polymeric matrix materials. Alumina and silicon nitride are preferred ceramic matrix materials.

The fiber reinforcement may comprise any continuous or discontinuous electrically nonconductive fiber. For example, continuous glass fibers are preferred as the fiber reinforcement of a fiber reinforced polymer matrix composite material, while discontinuous ceramic fibers are preferred as the fiber reinforcement of a fiber reinforced ceramic matrix material. Suitable glass fibers include for example, S-Glass® (PPG) or E-Glass. S-Glass® has a softening point of 1,778° F. and a tensile strength of $665 \times 10^3$ psi at 70° F. E-Glass has a softening point of 1,155° F. and a tensile strength of $500 \times 10^3$ psi. Suitable discontinuous ceramic fibers include silicon carbide whiskers.

A fiber reinforced polymer matrix wall portion may comprise between about 60 volume percent and about 70 volume percent fibers and between about 30 volume percent and 40 volume percent polymer matrix.

In a preferred polymer matrix composite embodiment, the wall portions are made by machining sections of fiber reinforced polymer matrix composite tubes to the required dimensions. Suitable glass fiber reinforced epoxy matrix composite tubes are available from commercial sources, e.g. Kemlox "G", pattern K-143, manufactured by Keystone Engineering Co. of Houston, Tex. or Randolite (Grade PD41) glass fiber reinforced epoxy matrix composite tubes manufactured by The Randolph Co. of Houston, Tex. The Kemlox "G", pattern K-143 composite tubes comprise about 30 to 35 volume percent of a proprietary epoxy resin formulation and 65 to 70 volume percent E-glass reinforcement. In the K-143 pattern, about 50 percent of the fiber reinforcement is oriented in the axial direction of the tube. The Kemlox "G" pattern K-143 tubes exhibit a heat resistance of about 400° F., a flexural strength between 80,000 psi and 95,000 psi, a flexural modulus of $3.0 \times 10^6$ psi to $3.5 \times 10^6$ psi, a tensile modulus of $3 \times 10^6$ psi to $4 \times 10^6$ psi, an impact strength (IZOD) of 12 to 15 ft lb/in and a hardness (Rockwell M) of 115 to 117.

In a preferred ceramic matrix composite embodiment, the wall portions are made by cold isostatic pressing and sintering a mixture of silicon carbide whiskers and alumina to form a composite wall portion of the desired dimensions. Preferably, the fiber reinforced ceramic matrix composite material includes from about 5 volume percent to about 10 volume percent fibers and from about 90 volume percent to about 95 volume percent ceramic matrix. A suitable ceramic matrix composite material is known as ARtuff® CC 5000, made by Advanced Composite Materials Corporation of Greer, S.C. The ARtuff® CC 5000 material has a Youngs modulus of 50 MPSI, a hardness (KNOOP) of 2100 and a fracture toughness of 5 KPSI in ½.

As shown in FIG. 4a, a hybrid composite wall portion 47 may be made by adhesively bonding a fiber reinforced ceramic matrix composite layer 48 over a fiber reinforced polymer matrix composite layer 49.

The shell of the present invention overcomes two of the major problems exhibited by prior art devices in that the elastomer layer of the present invention is free at its outer edges and is maintained in sealing contact with the housing by the shell of the present invention and in that the shell of the present invention may be replaced in the field.

The wall portion 2 compresses the elastomeric layer 38 so that sealing contact is maintained between the elastomeric layer 38 and housing 22.

Figure 6:
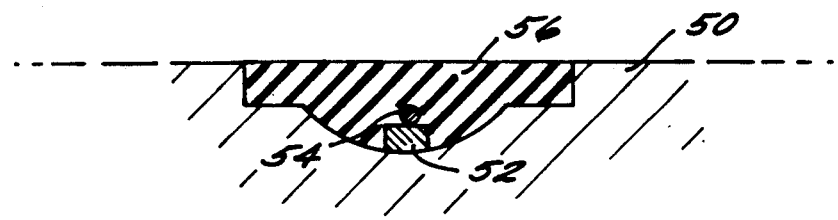
FIGS. 6 and 7 show longitudinal cross sectional views of a portion of an exemplary prior art formation evaluation tool.
Figure 7:
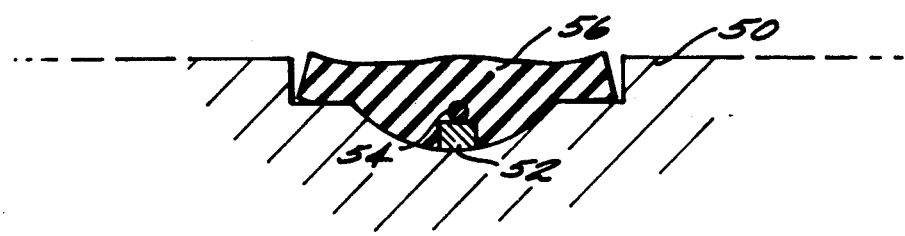

Referring to FIGS. 6 and 7, an exemplary prior art tool includes a housing 50 having a circumferential groove therein, a bracket 52 secured within the groove, an antenna loop 54 secured to the bracket 52 and an elastomeric layer 56 bonded within the groove and surrounding the antenna loops 54. FIG. 6 shows a tool and an unstressed elastomer layer 56. FIG. 7 shows a schematic representation of the deformation exhibited by elastomer layer 56 when the tool is subjected to elevated temperature and pressure in a downhole environment. The deformation shown has been greatly exaggerated for the sake of clarity. The elastomeric layer has a nonuniform thickness and the relatively thick central portion of the layer undergoes a more pronounced dimensional change than the outer portion, thereby generating forces which tend to peel the elastomer layer 56 away from the housing 50. Failure of the bond between the elastomer layer 56 and the housing creates a potential fluid leak path to the antenna loop 54.

When the elastomer layer of the prior art tool was damaged or worn out, the tool would have to be removed from service and shipped to a remote facility for repairs. The device of the present invention may be easily replaced at the drillsite with minimal down time by simply unbolting the damaged shell, inspecting the underlying elastomer layer for damage and installing a new shell over the elastomer layer once it has been determined that the elastomer layer is undamaged.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A device for protecting an antenna of a formation evaluation tool, said tool including a cylindrical housing, said housing having an outer surface and having a circumferential groove defined in said outer surface, said antenna surrounding said housing and being secured within said circumferential groove, comprising:
   an elastomeric layer within said groove and surrounding said antenna, said elastomeric layer having an outer surface of a first predetermined contour;
   a rigid, abrasion resistant and electrically nonconductive shell means for covering said elastomeric layer, said shell means having an inner surface of a second predetermined contour complementary to said first predetermined contour for maintaining at least portions of said elastomeric layer in sealing contact with said housing and said shell means comprising a pair of wall portions wherein each wall portion includes an inner surface and an outer surface, and means for equalizing pressure between the inner surface of said wall portion and the outer surface of said wall portion; and
   means for removably securing said shell means to said housing.

2. The device of claim 1, wherein the means for equalizing comprises a plurality of holes through said wall portions communicating between said inner surface and said outer surface.

3. A device for protecting an antenna of a formation evaluation tool, said tool including a cylindrical housing, said housing having an outer surface and having a circumferential groove defined in said outer surface, said antenna surrounding said housing and being secured within said circumferential groove, comprising:
   an elastomeric layer within said groove and surrounding said antenna, said elastomeric layer having an outer surface of a first predetermined contour;
   a rigid, abrasion resistant and electrically nonconductive shell means for covering said elastomeric layer, said shell means having an inner surface of a second predetermined contour complementary to said first predetermined contour for maintaining at least portions of said elastomeric layer in sealing contact with said housing and said shell means including a pair of wall portions; wherein, in longitudinal cross sectional of each of said wall portions, the wall portion has a substantially straight outer side extending longitudinally from a first end of the wall portion to a second end of the wall portion and has a profiled inner side extending from the first end of the wall portion to the second end of the wall portion, said inner side having a trapezoidal indentation therein; and
   means for removably securing said shell means to said housing.

4. A device for protecting an antenna of a formation evaluation tool, said tool including a cylindrical housing, said housing having an outer surface and having a circumferential groove defined in said outer surface, said antenna surrounding said housing and being secured within said circumferential groove, comprising:
   an elastomeric layer within said groove and surrounding said antenna, said elastomeric layer having an outer surface of a first predetermined contour;
   a rigid, abrasion resistant and electrically nonconductive shell means for covering said elastomeric layer, said shell means having an inner surface of a second predetermined contour complementary to said first predetermined contour to maintain at least portions of said elastomeric layer in sealing contact with said housing, wherein the shell means comprises an outer layer of a fiber reinforced ceramic matrix composite material and an inner layer of a fiber reinforced polymer matrix composite material; and
   means for removably securing said shell means to said housing.

5. A formation evaluation tool, comprising:
   a cylindrical housing, said housing having an outer surface and having a circumferential groove defined in said outer surface, said groove having a central toric section and first and second shoulder sections on opposite sides of said toric section;
   an antenna loop surrounding the housing and secured within the circumferential groove;
   elastomeric means within said groove and surrounding said antenna loop, for protecting said antenna loop from shock and moisture, said elastomeric means having a central portion bonded to said toric section and first and second end portions contacting said first and second shoulder sections; and
   rigid, electrically nonconductive shell means, comprising a pair of wall portions removably secured to said housing and covering said elastomeric means, for protecting said elastomeric means from abrasion, said shell means compressing at least part of said elastomeric means into sealing engagement with said housing, wherein the shell means includes an inner surface, disposed in contact with the elastomeric means, an outer circumferential surface, and means for equalizing pressure between the outer circumferential surface and the inner surface.

6. A device for protecting an antenna of a formation evaluation tool, said tool including a cylindrical housing, said housing having an outer surface and having a circumferential groove defined in said outer surface, said antenna surrounding said housing and being secured within said circumferential groove, and said tool further including an elastomeric layer within said groove and surrounding said antenna, comprising:
   a rigid, abrasion resistant and electrically nonconductive shell means covering said elastomeric layer;
   said shell means having at least two segments, each of said segments having an inner surface and an outer surface;
   means for equalizing pressure between said inner and outer surfaces of said segments; and
   means for removably securing said shell means to said housing at said groove.

7. The device of claim 6, wherein the means for equalizing comprises a plurality of holes through at least one of said segments communicating between said inner and outer surfaces of said segments.

8. The device of claim 6, wherein, in longitudinal cross section, each of said segments has a substantially straight outer side extending longitudinally from a first end of the segment to a second end of the segment and a trapezoidally shaped inner side extending from the first end of the segment to the second end of the segment.

9. A device for protecting an antenna of a formation evaluation tool, said tool including a cylindrical housing, said housing having an outer surface and having a circumferential groove defined in said outer surface, said antenna surrounding said housing and being secured within said circumferential groove, and said tool further including an elastomeric layer within said groove and surrounding said antenna, comprising:

a rigid, abrasion resistant and electrically nonconductive shell means covering said elastomeric layer;

said shell means comprising an outer layer of fiber reinforced ceramic matrix composite material and an inner layer of a fiber reinforced polymer matrix composite material; and means for removably securing said shell means to said housing at said groove.

10. A formation evaluation tool, comprising:

a cylindrical housing, said housing having an outer surface and having a circumferential groove defined in said outer surface;

an antenna loop surrounding the housing and secured within the circumferential groove;

elastomeric means, sealingly contacting said housing within said groove and surrounding said antenna loop, for protecting said antenna loop from shock and moisture;

rigid electrically nonconductive shell means, removably secured to said housing and covering said elastomeric means, for protecting said elastomeric means from abrasion; and said shell means being in at least two segments and including an inner surface disposed in contact with the elastomeric means, an outer circumferential surface, and means for equalizing pressure between the outer circumferential surface and the inner surface.

* * * * *